US012794561B2

(12) United States Patent
Gurusami et al.

(10) Patent No.: US 12,794,561 B2
(45) Date of Patent: Nov. 10, 2026

(54) METHOD AND SYSTEM FOR MULTI-LEVEL AMPLITUDE OPTICAL SIGNAL GENERATION USING BINARY LEVEL KEYING OF MULTIPLE SOURCES

(71) Applicant: II-VI Delaware, Inc., Wilmington, DE (US)

(72) Inventors: Aravanan Gurusami, Wilmington, DE (US); Julie Sheridan Eng, Wilmington, DE (US); Christopher Kocot, Wilmington, DE (US); Giovanni Barbarossa, Wilmington, DE (US)

(73) Assignee: II-VI Delaware, Inc., Wilmington, DE (US)

( * ) Notice: Subject to any disclaimer, the term of this patent is extended or adjusted under 35 U.S.C. 154(b) by 175 days.

(21) Appl. No.: 18/658,721

(22) Filed: May 8, 2024

(65) Prior Publication Data

US 2025/0350367 A1 Nov. 13, 2025

(51) Int. Cl.
*H04B 10/54* (2013.01)
*H04B 10/516* (2013.01)
*H04B 10/524* (2013.01)

(52) U.S. Cl.
CPC ....... *H04B 10/541* (2013.01); *H04B 10/5161* (2013.01); *H04B 10/524* (2013.01)

(58) Field of Classification Search
CPC . H04B 10/5161; H04B 10/524; H04B 10/541
See application file for complete search history.

(56) References Cited

U.S. PATENT DOCUMENTS 6,821,026 B2 * 11/2004 Devine .................. H01S 5/423 385/91
9,094,130 B2 7/2015 Bliss et al.
(Continued)

FOREIGN PATENT DOCUMENTS

GB 2469625 A * 10/2010 .......... H04B 10/541
KR 20140122355 A 10/2014
WO WO-2018002675 A1 * 1/2018 .......... G02B 6/4214

OTHER PUBLICATIONS

Lu et al Flip-Chip Integration of Tilted Vcsels Onto a Silicon Photonic Integrated Circuit (Year: 2016).*
(Continued)

*Primary Examiner* — David C Payne
*Assistant Examiner* — Mohammed Abdelraheem
(74) *Attorney, Agent, or Firm* — McAndrews Held & Malloy, Ltd.

(57) ABSTRACT

An optical signal generation system for multi-level optical signal generation using binary keying comprises an array of light sources, a control circuit, and an optical coupling mechanism. The system may be operable to configure, using the control circuit, each of the light sources in the array of light sources in a HIGH or LOW state base on a received input signal to generate a plurality of optical output signals. The plurality of optical output signals may be communicated to the optical coupling mechanism and combined into a single optical signal thereby generating a multi-level output signal representative of the received input signal. The multi-level output signal may comprise a Pulse Amplitude Modulated (PAM) equivalent signal. The array of light sources may comprise vertical cavity surface emitting lasers (VCSELs), edge-emitting lasers, or light emitting diodes (LEDs).

26 Claims, 9 Drawing Sheets

(56) References Cited

U.S. PATENT DOCUMENTS

| | | | | |
|---|---|---|---|---|
| 9,620,934 | B2 * | 4/2017 | Su | H01S 5/0234 |
| 10,243,323 | B2 * | 3/2019 | Caer | G02B 6/13 |
| 2003/0235415 | A1 * | 12/2003 | Peters | H04B 10/506<br>398/197 |
| 2014/0301736 | A1 * | 10/2014 | Huh | H04B 10/541<br>398/115 |
| 2021/0336414 | A1 * | 10/2021 | Harris | G02B 6/12019 |

OTHER PUBLICATIONS

Generation_of_PAM4_signal_over_10-km_multi_core_fiber_using_DMLs_and_photodiode (Year: 2017).*

European Office Communication with extended search report Appln No. 24216628.8 dated May 19, 2025.

Shen Ying et al: "Generation of PAM4 signal over 10-km multi core fiber using DMLs and photodiode", 2017 9th International Conference on Advanced Infocomm Technology (ICAIT), IEEE, Nov. 22, 2017 (Nov. 22, 2017), pp. 300-303, XP033359786, DOI: 10.1109/ICAIT.2017.8388934 [retrieved on Jun. 19, 2018].

Low-Power (1.5 pJ/b) Silicon Integrated 106 Gb/s PAM-4 Optical Transmitter; Joris Lambrecht, Jochem Verbist, Hannes Ramon, Michael Vanhoecke, Johan Bauwelinck, in Yin, and Gunther Roelkens; Journal of Lightwave Technology, vol. 38, No. 2, Jan. 15, 2020.

A 100 GB/s PAM-4 Silicon Photonic Transmitter with Two Binary-Driven EAMs in MZI Structure; Arian Hashemi Talkhooncheh, Aaron Zilkie, Guomin Yu, Roshanak Shafiha, Azita Emami, Department of Electrical Engineering, California Institute of Technology, Pasadena, CA, USA, ahashemi@caltech.edu; Rockley Photonics Inc., Pasadena, CA, USA ; aaronzilkie@rockleyphotonics.com.

* cited by examiner

300

500

METHOD AND SYSTEM FOR MULTI-LEVEL AMPLITUDE OPTICAL SIGNAL GENERATION USING BINARY LEVEL KEYING OF MULTIPLE SOURCES

BACKGROUND

Traditional optical modulation schemes, such as Pulse Amplitude Modulation (PAM), Quadrature Amplitude Modulation (QAM), etc. typically rely on linear modulation techniques that adjust signal parameters continuously within a certain range. These methods, while effective, often require complex and precise control systems to maintain signal integrity, especially at high data rates. There exists a need for a simpler, more cost-effective approach that reduces the reliance on precise analog control mechanisms without compromising the ability to meet the increasing demand for bandwidth.

The subject matter of the present disclosure is directed to overcoming, or at least reducing the effects of, one or more of the problems set forth above.

SUMMARY OF THE DISCLOSURE

The present disclosure pertains to the field of optical communications, specifically to the modulation techniques used in the encoding and transmission of data over optical fibers or free space. In some examples, the present disclosure introduces a novel method and system for optical signal generation that capitalizes on the discrete modulation of amplitude through binary HIGH/LOW keying, individually or in combination. Unlike conventional linear modulation techniques that require multi-level variation of signal parameters, this method employs binary switching to modulate optical signals, offering a simplified approach to achieving high data rates and efficient signal processing in optical communication systems.

In accordance with disclosed examples, the disclosure introduces a method and system for generating an optical signal by employing binary HIGH/LOW keying—a binary switching mechanism—for light source output amplitudes, individually or in concert. This approach simplifies the generation and recovery processes in some cases, enabling efficient use of the optical spectrum while facilitating high data throughput and reducing the complexity of optical communication systems.

These and other features of the present disclosure will become more fully apparent from the following description and appended claims, as set forth hereinafter.

The foregoing summary is not intended to summarize each potential embodiment or every aspect of the present disclosure.

BRIEF DESCRIPTION OF THE DRAWINGS

To further clarify the above and other features of the present disclosure, a more particular description of the subject matter will be rendered by reference to specific examples thereof, which are illustrated in the appended drawings. It is appreciated that these drawings depict only some examples of the subject matter and are therefore not to be considered limiting of its scope.

The invention is more completely described by the accompanying drawings. These figures may merely be schematic representations of current filters, assemblies, facilities, or methods to enhance understanding of the disclosed concepts.

DETAILED DESCRIPTION OF THE DISCLOSURE

Laser arrays for multi-level signal generation through modulation of the lasers using binary keying are disclosed herein that includes an optical transmitter comprising an array of lasers, a control circuit, and an optical coupling mechanism. The system may be operable to configure, using the control circuit, each of the lasers in the array of lasers in a HIGH or LOW state based on a received input signal to generate a plurality of optical output signals. The plurality of optical output signals may be combined by the optical coupling mechanism into a single optical signal thereby generating a multi-level output signal representative of the received input signal.

Figure 1:
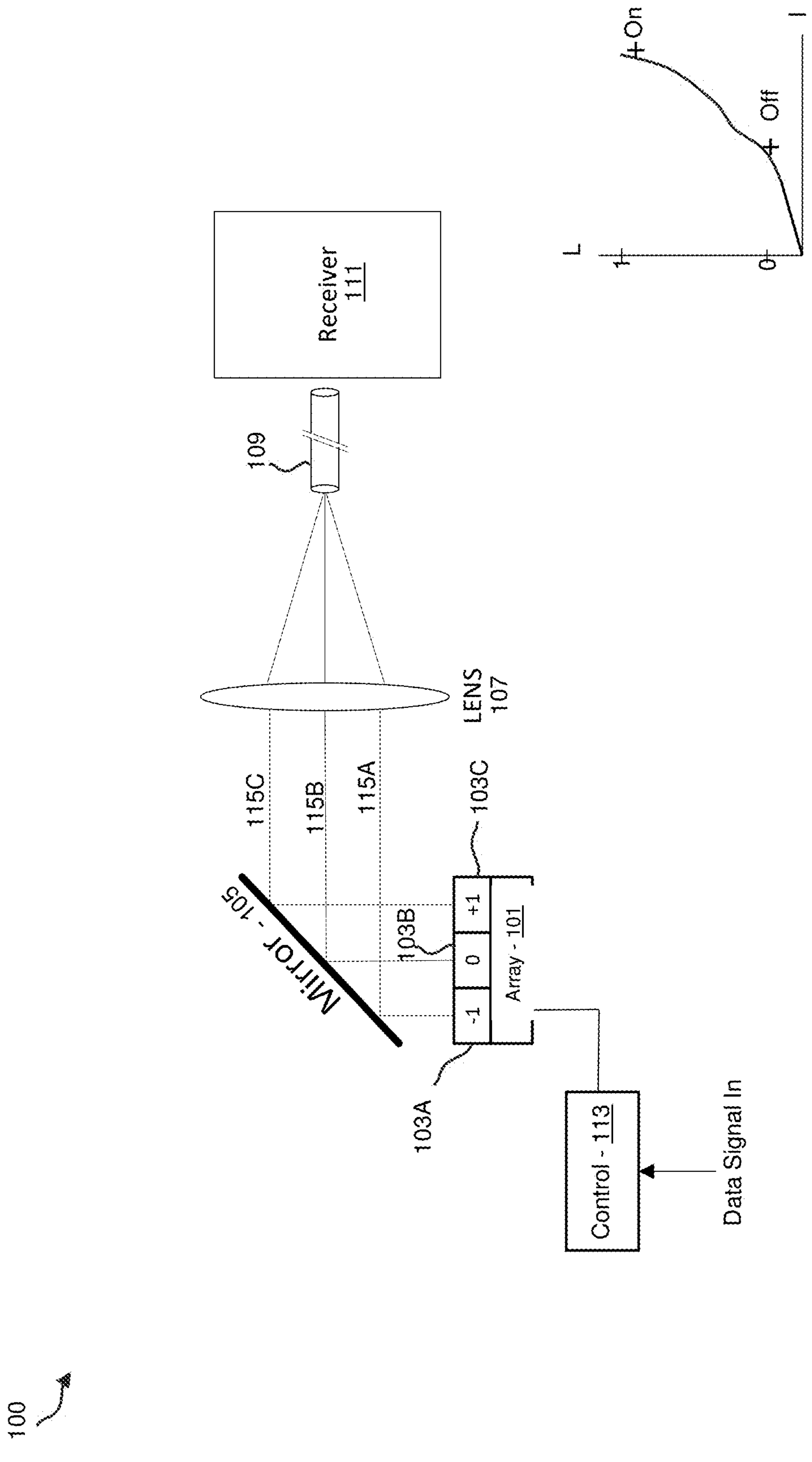
FIG. 1 illustrates an example light source array for optical signal generation using binary keying, in accordance with an example embodiment of the present disclosure.

Turning to the figures, FIG. 1 illustrates an example light source array for optical signal generation using binary keying, in accordance with an example embodiment of the present disclosure. Referring to FIG. 1, there is shown an optical communication system 100 comprising a light source array 101, a mirror 105, a lens 107, an optical fiber 109, a receiver 111, and a control 113. In this example, the light source array comprises three light sources 103A-103C that are visible, although any number of light sources may be utilized, based on the desired output levels. In the present example, three lasers may be utilized for PAM-4, or PAM-4 equivalent, modulation, in that the resulting PAM-4 equivalent signal is the same as a PAM-4 signal but with different means of generation. The labeling of the three light sources with −1, 0, and +1 is merely an example of symmetric placement, although the disclosure is not so limited as any orientation and placement is possible depending on space available, for example. It should be noted that in this example, the light sources may comprise VCSELS or LEDs, or any structure capable of emitting from the surface of the structure.

In this example scenario, the four PAM levels are defined by each light source 103A-103C being in a HIGH or LOW state, as opposed to varying the optical intensity of a single light source at multiple levels. Accordingly, in one example, PAM-4 equivalent modulation may be configured as LOW/LOW/LOW, LOW/HIGH/LOW, LOW/HIGH/HIGH, and HIGH/HIGH/HIGH, thereby providing four distinct power levels without any of the light sources 103A-103C requiring accurate analog control to obtain four different output levels. It should be noted that the LOW state for each light source does not imply zero current, but a value above the threshold current level for the device, as shown in the inset of FIG. 1, thereby enabling increased switching speed. The LOW state quiescent current may be increased to a higher current, for example, to increase bandwidth.

The addition of each light source turning on provides another output optical signal level. For PAM-8 equivalent modulation, seven light sources may be utilized arranged on the vertices and the center of a hexagon, for example, as shown further with respect to FIG. 2. Furthermore, any number of light sources is possible in any spatial configuration, including a number of light sources for redundancy of the optical signal generation system.

A primary advantage of this binary light source modulation and multi-level signal generation scheme is simplified signal generation. From a transmitter standpoint, the combined signal looks just like a PAM signal without having to configure a single light source at multiple levels, i.e., a PAM equivalent signal. By utilizing binary switching, the system reduces the need for complex control electronics and precise analog adjustments, while still enabling signal generation beyond 100 GBaud. Furthermore, the L-I curve shown in the inset of FIG. 1 of a laser or LED source illustrates another advantage of the binary amplitude modulation/signal generation scheme, that any non-linearity in the L-I curve has no impact on operation, because there is no need to accurately control outputs at multiple current levels along the curve.

The light sources 103A-103C may generate optical signals in the infrared wavelength range, such as in the 850 nm range, although it can be applied at 1.3 μm and/or 1.5 μm ranges, for optical communication purposes, while other wavelength ranges are possible. The light sources 103A-103C may be fabricated on a single substrate with heat sinking capability, for example, and may comprise VCSELS, LEDs, micro-LEDs, a back-lit LCD panel, plasma, or OLEDs.

FIG. 1 also shows a mirror 105, a lens 107, optical fiber 109, a receiver 111, and control 113. The mirror 105 comprises a reflective surface for redirecting the various optical signals generated by the light sources 103A-103C to the lens 107. In the example shown, the mirror provides a 90 degree turn for optical signals from the light sources 103A-103C to the lens 107, although other angles are possible depending on the placement of the downstream optics, and a mirror may not be needed if emission is directly into the fiber, for example.

The lens 107 may focus the received optical signals 115A-115C into a single core of optical fiber 109 for multi-level signal generation, thereby providing a simple optical coupling mechanism to combine the plurality of light source outputs into a single optical signal for communication via fiber 109 or free-space transmission. While FIG. 1 shows one lens, the lens 107 may instead comprise a plurality of lenses depending on the focusing needs of the received optical beams. In another example embodiment, the mirror and lens may be incorporated into a single optic assembly, or both the lens and mirror may be eliminated depending on the beam direction of the light source outputs.

The control 113 may comprise circuitry for configuring current into the light sources 103A-103C, and as such may comprise a processor and associated electronics for controlling output currents to be applied to the light sources 103A-103C. While a single block is shown for the control 113, a number of separate circuit blocks may be used, such as a quiescent bias circuit and a modulating HIGH/LOW current circuit for modulation.

As the multi-level outputs are defined by binary HIGH/LOW conditions of the light sources 103A-103C, the complexity of the circuitry may be reduced compared to control circuitry needed for accurate control of current for multiple output levels and associated settling times for each level. Since the control 113 only needs to configure the HIGH or LOW state, there are reduced, or nonexistent, linearity requirements of the light sources 103A-103C. Accordingly, the control 113 may comprise digital circuitry that configures HIGH or LOW levels, without the need for analog circuitry for controlling varying output levels between HIGH and LOW. For example, a digital-to-analog converter (DAC), which is needed in conventional PAM applications to configure the light output to multiple intensity levels, is not needed in the present disclosure with binary modulation.

The receiver 111 may comprise circuitry for receiving an optical signal and generating a demodulated signal that is representative of the signal communicated via the fiber 109. Accordingly, the receiver 111 may comprise amplification, detection, and demodulation capabilities, for example, for generating an electrical signal from the received optical signal or signals.

In operation, an electrical data signal, Data Signal In, may be communicated to control 113, which in turn applies the digital signal to the light source array 101 turning each of the light sources 103A-103C into a HIGH or LOW state, with the states being configured to generate four levels for PAM-4 equivalent modulation, for example, by the summation of HIGH optical signals. The individual optical signals 115A-115C are directed to the lens 107 by the mirror 105, with the focal length of the lens 107 such that the beams are focused at the input facet of the fiber 109. In another example embodiment, the lens 107 may focus the optical signals 115A-115C directly to an input of the receiver 111 via free-space communication.

With each of the optical signals 115A-115C being coupled into the core of the fiber 109, the optical intensities are summed, thereby resulting in multiple possible levels defined by the binary state of each light source 103A-103C. In this manner, PAM-4 equivalent signals are communicated to the receiver 111 without the need for configuring any light source at multiple output levels, greatly reducing circuit complexity. While a PAM-4 equivalent, in that it is identical to a PAM signal but with different means of generation, is shown in this example, any level modulation may be utilized depending on the number of light sources.

A reduced modulation depth reduces the variation of carrier density, thus leading to a reduction in the change in refractive index in the cavity, reducing laser chirp, for example. With reduced chirp, the spectral width of the emitted carrier is narrower and reduces pulse broadening with transmission distance in a fiber. Although modal dispersion is primarily a factor of fiber modal properties and the optical signal's initial modal distribution, reduced chirp can help maintain tighter pulse widths, indirectly mitigating/ reducing inter-modal interference that can be exacerbated by broader spectral content. Reducing the depth of modulation allows the laser to operate in more linear region, which reduces non-linear distortion resulting from high modulation depth thus improving signal integrity for advanced modulation formats.

Figure 2:
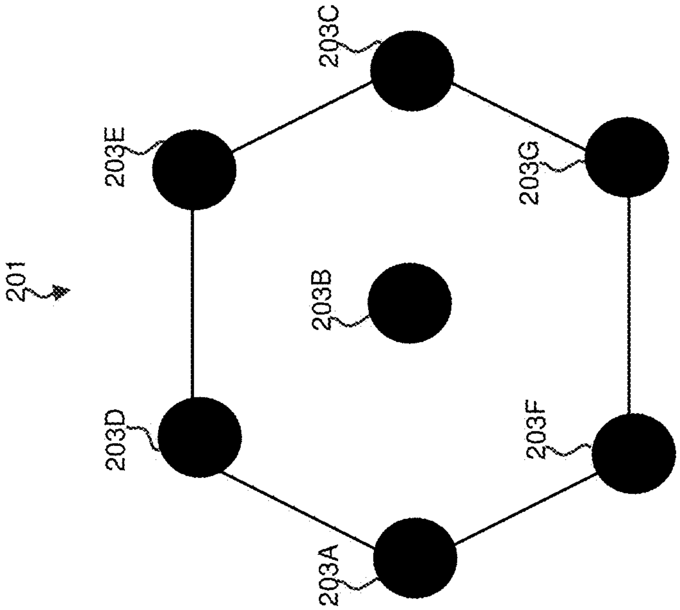
FIG. 2 illustrates a diagram of an example light source arrangement for binary keying, in accordance with an example embodiment of the present disclosure.

FIG. 2 illustrates a diagram of an example light source arrangement for binary keying, in accordance with an example embodiment of the present disclosure. Referring to FIG. 2, there is shown an array 201 of seven light sources 203A-203G with six of the lasers arranged on the six corners of a hexagon with one in the middle. In this manner, a PAM-8 equivalent signal may be generated using the seven light sources 203A-203G. In this manner, an N-level signal may be generated by (N−1) light sources with each light source being binary modulated. In another example embodiment, some of the light sources 203A-203G may provide redundancy for a lower-level modulation scheme, such as PAM-4 equivalent, for example. While a symmetric hexagonal array is shown in FIG. 2, the disclosure is not so limited as any orientation and placement is possible as determined by spatial or heat sinking requirements, for example. The light sources 203A-203G may comprise VCSELS, LEDs, micro-LEDs, a back-lit LCD panel, plasma, or OLEDs, for example.

Figure 3:
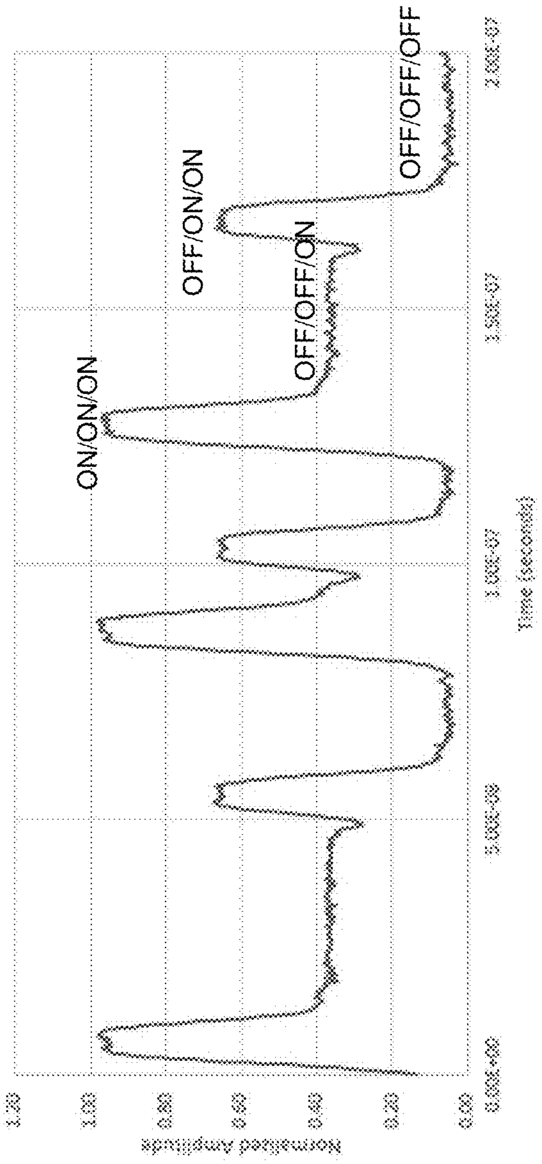
FIG. 3 illustrates combined light source array output versus time using only binary keying of more than one element of the array in concert, in accordance with an example embodiment of the present disclosure.

FIG. 3 illustrates combined light source array output versus time using only binary keying of more than one element of the array in concert, in accordance with an example embodiment of the present disclosure. In this example, the light source array comprises VCSELs, although other sources are possible, as described above. The plot 300 shows normalized amplitude of combined optical signals versus time, such as the optical signal intensity in the fiber 109 and/or at the receiver 111 of FIG. 1. Each of the four PAM-4 equivalent levels are labeled in one instance in FIG. 3, where the 0 level is configured with LOW/LOW/LOW output levels of each laser, the 1 level is configured with LOW/LOW/HIGH output levels, the 2 level is configured with HIGH/HIGH/LOW, and the 3 level is configured with HIGH/HIGH/HIGH. In another example, the 0 level is configured with LOW/LOW/LOW output levels of each laser, the 1 level is configured with LOW/HIGH/LOW output levels, the 2 level is configured with LOW/HIGH/HIGH, and the 3 level is configured with HIGH/HIGH/HIGH. Other examples are possible.

The plot 300 illustrates a PAM-4 equivalent signal with only HIGH or LOW output levels configured for each laser in the array, eliminating the need for complex controller circuitry for multi-level signaling. In traditional multilevel modulation with a single laser, the laser and the driver need to exhibit linearity and high slew rate to reach the full swing in one unit time interval. With binary keying of equally weighted lasers, each laser can work with a reduced slew rate (⅓rd the value of a single laser).

Figure 4:
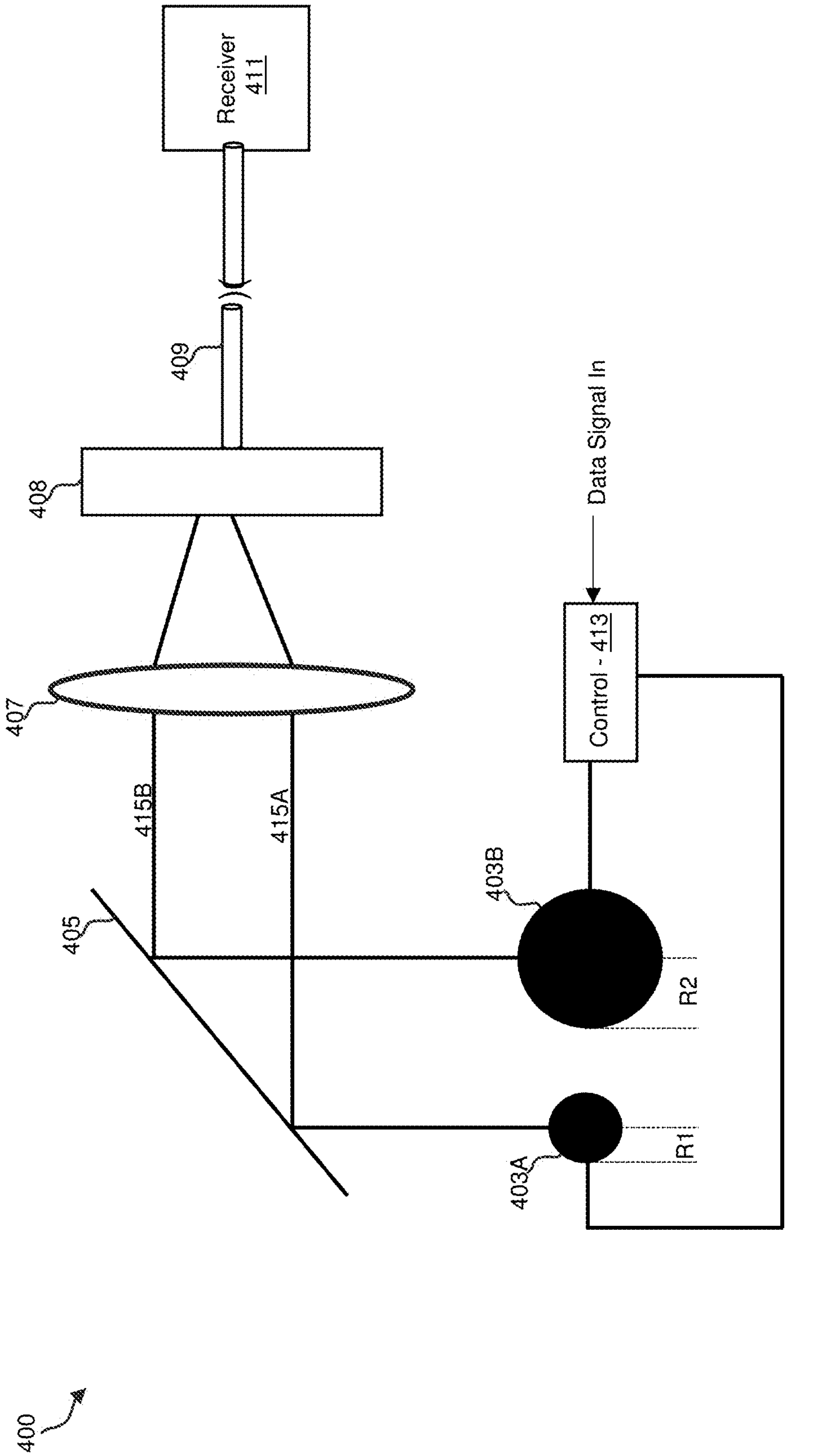
FIG. 4 illustrates a binary-weighted light source array using binary keying, in accordance with an example embodiment of the present disclosure.

FIG. 4 illustrates a binary-weighted light source array using binary keying, in accordance with an example embodiment of the present disclosure. FIG. 4 illustrates a binary-weighted light source generation system 400 comprising light sources 403A and 403B, a mirror 405, a lens 407, a combiner 408, a fiber 409, a receiver 411, and a control 413.

The light sources 403A and 403B may be substantially similar to the light sources described with respect to FIG. 1 comprising VCSELs or LEDs, but comprising different optical power areas from each other, as shown by the different radii R1 and R2 in FIG. 4. As the optical power of a VCSEL or LED scales with optical output area, all else being equal, to get twice the output of light source 403A emitting from light source 403B, R2 is sqrt (2) times larger than R1. This optical power scaling by 2 can be expanded to any number of light sources, depending on the desired modulation scheme. Furthermore, while VCSELs are shown in FIG. 4, other light sources are possible, such as PCSELs, edge emitting lasers, light emitting diodes (LEDs), micro-LEDs, a back-lit LCD panel, plasma, or OLEDs.

In another example scenario, the binary-weighted output intensity of the light sources in the array may be configured by number of junctions in the light sources, where a double output power may be obtained by activating a laser or LED with two junctions as compared to one junction. In yet another scenario, in instances where it is desirable to have the same light sources, different output levels may be obtained by coating some of the lasers with neutral density filters, thereby enabling multiple output levels while still having only binary HIGH/LOW control.

In this example embodiment, PAM-4 equivalent modulation is enabled with the two binary-weighted light sources 403A and 403B, where the 0, 1, 2, 3 outputs are configured by LOW/LOW, HIGH/LOW, LOW/HIGH, and HIGH/HIGH of the laser sources 403A and 403B, respectively, as configured by the control 413. As described above with respect to FIG. 1, the circuitry in the control 413 may be greatly simplified as compared to conventional PAM-4, or higher, driver circuitry, which must accurately control multiple laser output levels. Furthermore, any number of light sources is possible, including a number of light sources for redundancy of the multi-level optical generation system.

The mirror 405, lens 407, fiber 409, receiver 411, and control 413 may be substantially similar to the similarly named elements described with respect to FIG. 1, while the optional combiner 408 comprises an optical coupling device for combining multiple received optical signals into a single output, in instances where the lens 407 is not able to combine multiple input signals with different optical profiles to a single spot, e.g., the core of fiber 409 or directly onto receiver 411. Furthermore, while FIG. 4 shows one lens, the lens 407 may instead comprise a plurality of lenses depending on the focusing needs of the received optical beams. In this example, the combiner 408 may comprise a plurality of inputs for receiving optical signals generated by the light sources 403A and 403B and a single output for communicating an output optical signal into the fiber 409, or alternatively communicated via free-space to the receiver 411. The combiner 408 may comprise a waveguide coupler, a multiplexer, or other optical signal combiner.

In operation, the control 413 may receive an input signal, Data Signal In, and configure the light sources 403A and 403B in a HIGH or LOW state based on the received signal, where resulting optical signals 415A and 415B are reflected orthogonally by the mirror 405 and focused by the lens 407 into the combiner 408, which combines the optical signals 415A and 415B into a single optical signal for communication via the fiber 409, or free-space communication, to the receiver 411. In the receiver 411, the received modulated signal may be detected by a photodetector thereby generating an electrical signal representative of the Data Signal In used to modulate the light sources 403A and 403B.

Figure 5:
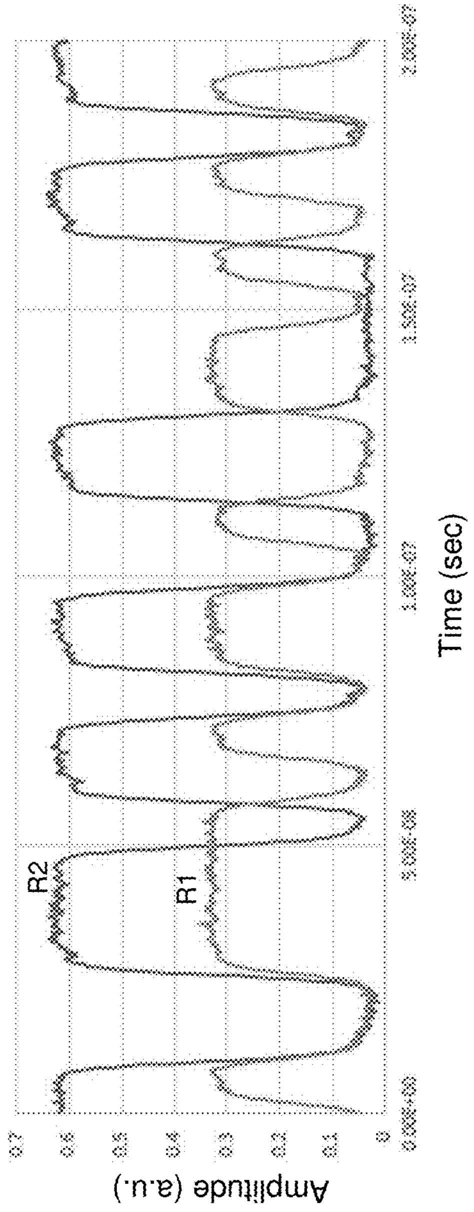
FIG. 5 illustrates binary-weighted light source outputs versus time using binary keying, in accordance with an example embodiment of the present disclosure.

FIG. 5 illustrates binary-weighted laser outputs versus time using binary keying, in accordance with an example embodiment of the present disclosure. Referring to FIG. 5, there is shown plot 500 with optical intensity in arbitrary units on the Y-axis and time in seconds on the X-axis. The output from light source 403A is shown by the output signal labeled R1 and the output signal from light source 403B is shown by the output signal labeled R2, where in this instance the light sources 403A and 403B comprise VCSELs although other types are possible such as LEDs, micro-LEDs, OLEDs, a plasm source, or back-lit LCD panels. As can be seen by the relative intensities, light source 403B has an intensity twice that of light source 403A. In this manner, two light sources can supply output levels of 0, 1, 2, and 3 by configuring the light sources 403A and 403B as LOW/LOW, HIGH/LOW, LOW/HIGH, and HIGH/HIGH. Furthermore, any number of light sources is possible, including a number of light sources for redundancy of the multi-level optical signal generation system.

In traditional multilevel modulation with a single laser, the laser and the driver need to exhibit linearity and high slew rate to reach the full swing in one unit time interval. With binary keying of binary-weighted lasers or LEDs, the higher output source can work with a reduced slew rate of ⅔ the value of a single source, while the lower output source can work with a slew rate 1/3 the rate of a single source. With a reduced modulation depth, there is a reduced variation of carrier density, thus leading to a reduction in the change in refractive index in the cavity, reducing chirp.

Figure 6:
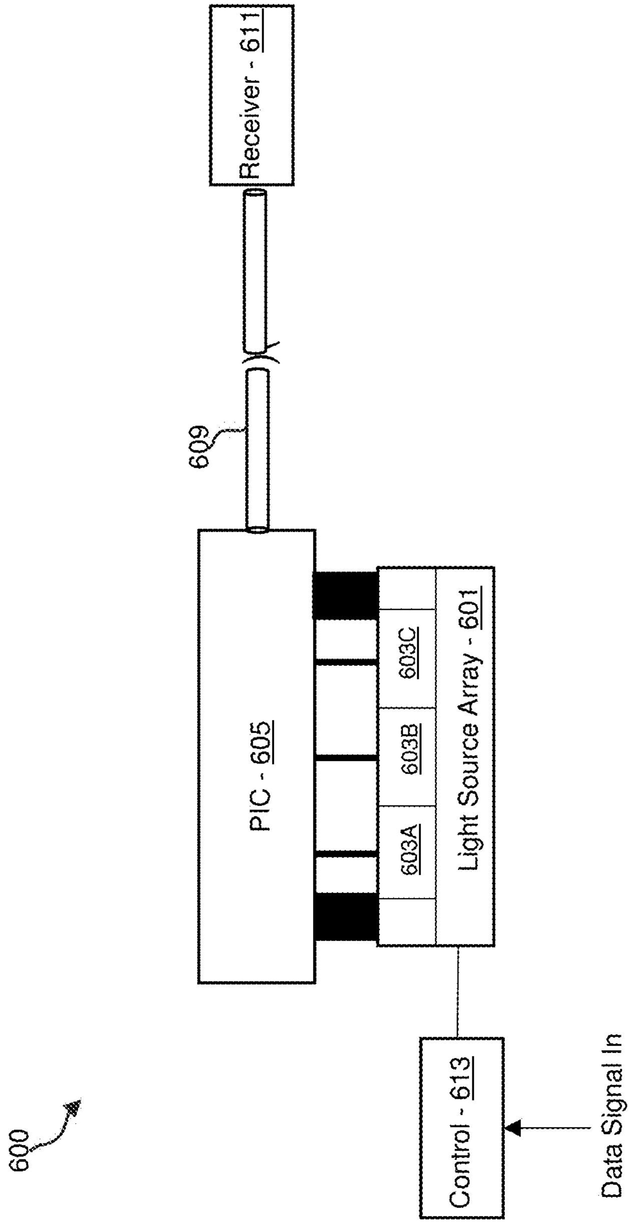
FIG. 6 illustrates a diagram of an example light source arrangement with a photonic integrated circuit for binary keying, in accordance with an example embodiment of the present disclosure.

FIG. 6 illustrates a diagram of an example light source arrangement with a photonic integrated circuit for binary keying, in accordance with an example embodiment of the present disclosure. FIG. 6 shows binary keying optical system 600 comprising a light source array 601, light sources 603A-603C, a photonic integrated circuit (PIC) 605, optical fiber 609, receiver 611, and control 613. The light source array 601, light sources 603A-603C, fiber 609, receiver 611, and control 613 may be substantially similar to similarly named elements of FIGS. 1 and 4, but in this instance, the PIC 605 is used for receiving the plurality of optical signals from the light sources 603A-603C and coupling to optical fiber 609, or alternatively for free-space coupling optical signals to the receiver 611. The light sources 603A-603C may comprise VCSELs, LEDs, micro-LEDs, OLEDs, a plasm source, or back-lit LCD panels, for example.

The PIC 605 may comprise silicon or other material used in making PICs and may comprise a plurality of optical components for manipulating optical signals within the structure, with the objective of receiving a plurality of optical signals from the light sources 603A-603C and coupling to optical fiber 609, thereby providing an optical coupling mechanism for summing optical signals. Accordingly, the PIC 605 may comprise optical couplers for receiving optical signals from the light sources 603A-603C. The optical couplers may comprise grating couplers, for example. In addition, the PIC 605 may comprise waveguides for propagating the received optical signals to other optical components, such as one or more waveguide couplers for combining the optical signals into a single optical signal. In addition, the PIC 605 may comprise polarization rotators in instances where polarization control is desired in the PIC 605.

The PIC 605 may be physically coupled with the light source array 601 to align the light sources 603A-603C outputs to optical couplers in the PIC 605 for efficient coupling of the optical signals. Electrical interconnects, such as bump bonds, may be utilized to couple the light source array 601 to the PIC 605. Furthermore, any number of laser or LED sources is possible, including a number of light sources for redundancy of the modulation system.

In operation, the control 613 may receive an input signal, Data Signal In, and configure the light sources 603A-603C in a HIGH or LOW state based on the received signal, where resulting optical signals are coupled to the PIC 605, which combines the optical signals into a single optical signal for communication via the fiber 609, or alternatively free-space communication, to the receiver 611. The summation of the optical signals in the PIC 605 enables a multi-level data signal, such as PAM-4 equivalent or higher, with the light sources 603A-603C only biased in a HIGH or LOW state, without the need for accurate voltage control for multiple output levels. In the receiver 611, the received modulated signal may be detected by a photodetector thereby generating an electrical signal representative of the Data Signal In used to modulate the light sources 603A-603C.

Figure 7:
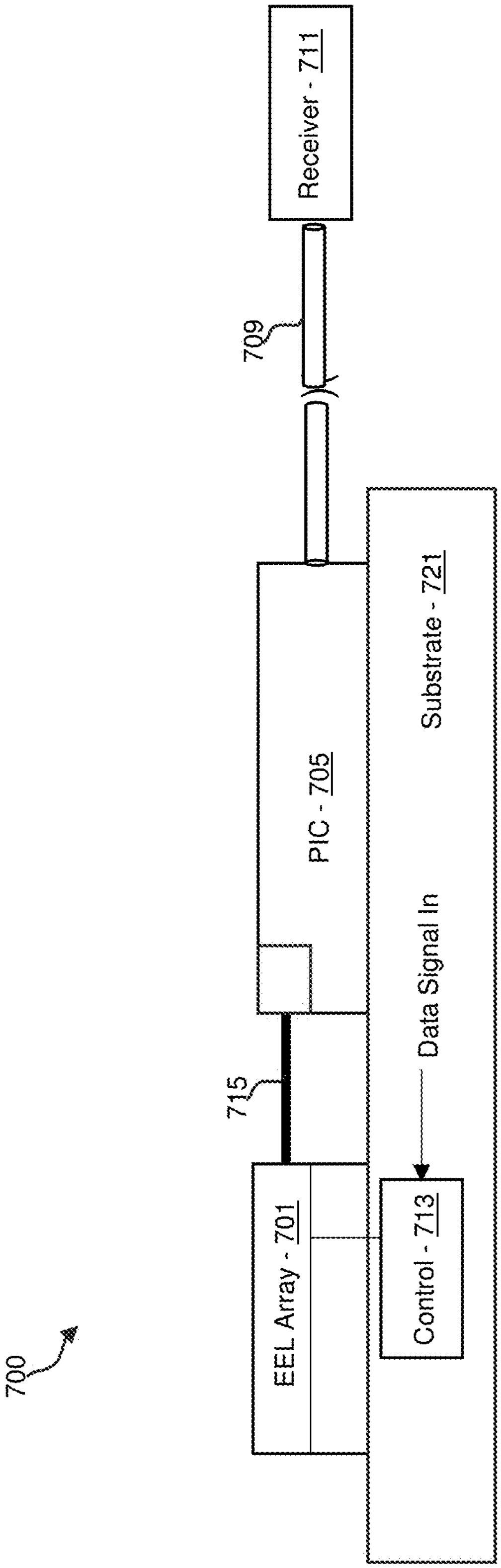
FIG. 7 illustrates a diagram of an example edge-emitting laser arrangement with a photonic integrated circuit for binary keying, in accordance with an example embodiment of the present disclosure.

FIG. 7 illustrates a diagram of an example edge-emitting laser arrangement with a photonic integrated circuit for binary keying, in accordance with an example embodiment of the present disclosure. Referring to FIG. 7, there is shown binary keying optical system 700 comprising a laser array 701, PIC 705, optical fiber 709, receiver 711, control 613, and a substrate 721. The PIC 705, fiber 709, receiver 711, and control 713 may be substantially similar to similarly named elements of FIGS. 1, 4, and 6, but in this instance, the laser array 701 is an array of edge-emitting lasers whose outputs signals are coupled horizontally into the PIC 705. In another example scenario, the laser array 701 may comprise a plurality of discrete lasers, i.e., each a separate chip. Furthermore, it is also possible to utilize a lens or lens assembly instead of PIC 705 to couple optical signals from the laser array 701 into the fiber 709, or alternatively via free-space to the receiver.

The substrate 721 may comprise a semiconductor or ceramic substrate upon which the laser array 701 and the PIC 705 may be bonded, enabling a fixed and accurate alignment between the laser array 701 and the PIC 705. In one example scenario, the substrate 721 may comprise a semiconductor substrate with circuitry for the control 713. The laser array 701 may comprise a plurality of edge-emitting semiconductor lasers operable to emit an array of optical signals 715 directed to the PIC 705.

The lasers of the laser array 701 may each be configured in HIGH or LOW states by the control 713 based on the Data Signal In. Furthermore, any number of laser sources is possible, including a number of lasers for redundancy of the modulation system.

The PIC 705 may comprise an array of optical couplers for receiving the optical signals 715 as well a plurality of waveguides and optical couplers for combing the plurality of optical signals 715 into a single optical signal to be communicated via the optical fiber. This summing of binary keyed optical signals enables multi-level modulation schemes without the need to accurate multi-level output control of the lasers in the laser array 701.

In operation, control 713 may receive an input signal, Data Signal In, and configure the lasers in the laser array 701 in a HIGH or LOW state based on the received signal, where resulting optical signals 715 are coupled to the PIC 705, which combines the optical signals into a single optical signal for communication via the fiber 709, or alternatively free-space communication, to the receiver 711. The summation of the optical signals in the PIC 705 enables a multi-level data signal, such as PAM-4 equivalent or higher, with the lasers in the laser array 701 only biased in a HIGH or LOW state, without the need for accurate voltage control for multiple output levels. In the receiver 711, the received modulated signal may be detected by a photodetector thereby generating an electrical signal representative of the Data Signal In used to modulate the laser array 701.

Figure 8:
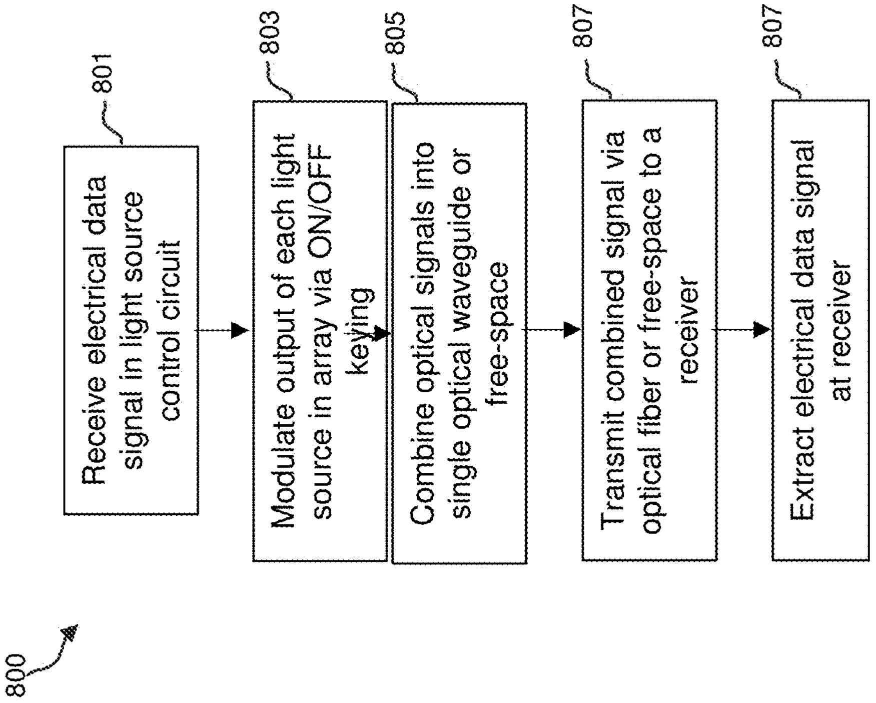
FIG. 8 is a flow diagram of a process for light source modulation using binary keying, in accordance with an example embodiment of the present disclosure.

FIG. 8 is a flow diagram of a process for light source modulation using binary keying, in accordance with an example embodiment of the present disclosure. Referring to FIG. 8, there is shown light source binary keying modulation process 800. The process starts in step 801 with receiving of an input electrical data signal in a light source control circuit 113, 413, 613, and 713 that is configured to bias the light sources 103A-103C, 403A/403B, 603A-603C of the light source array 101, 601, 701 in a HIGH or LOW state in step 803. In step 805, the optical signals are combined/summed into a single optical signal via optical coupling elements or by focusing onto the same spot of a waveguide in step 805, or via free-space communication directly to the same spot on a detector in a remote receiver. In step 807, the receiver extracts an output electrical signal based on the received optical signal.

Figure 9:
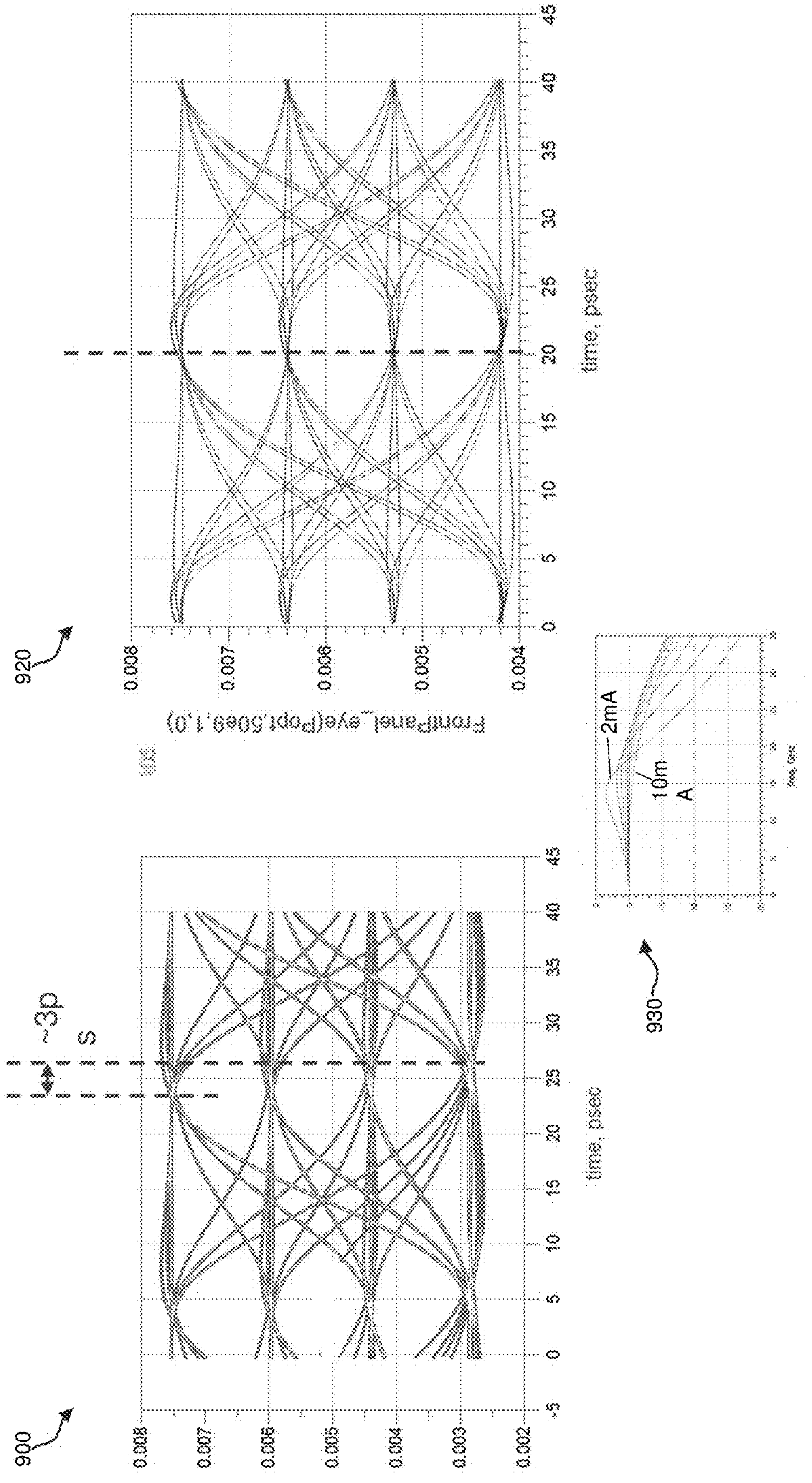
FIG. 9 illustrates eye diagram modeling results for a single laser PAM-4 system and a multi-laser binary keyed PAM-4 equivalent system, in accordance with an example embodiment of the disclosure.

FIG. 9 illustrates eye diagram modeling results for a single laser PAM-4 system and a multi-laser binary keyed PAM-4 equivalent system, in accordance with an example embodiment of the disclosure. Referring to FIG. 9, there is shown eye diagram 900 for a conventional single laser PAM-4 and eye diagram 920 for a multi-laser binary keyed PAM-4 equivalent system. There is also shown frequency response 930 of a VCSEL for different bias current, ranging from 2 mA up to 10 mA in 1 mA steps. The lower current frequency response curves show lower bandwidths while higher currents show flatter curves with higher bandwidths, as shown by the comparison of the 2 mA and 10 mA curves.

In addition to reduced bandwidth, VCSELs have a pronounced resonance at lower bias currents. When a VCSEL is operated in PAM-n mode, there are n different states, where each state can transition from its current state to any other state. The bandwidth associated with these transitions are dependent on the current state to the next state, so the bandwidth increases when the transitions are larger, as enabled by a binary keyed system as disclosed here. Furthermore, the dependence on transition size results in increased inter-symbol interference (ISI) and eye skew, and resonance in frequency response results in ringing and causes ISI.

The VCSEL frequency response shown in FIG. 9 is modeled based on VCSEL laser physics involving rate equations, which describe the dynamic behavior of carrier and photon density within the laser cavity. The rate equations for a VCSEL comprise two coupled differential equations for carrier density and photon density. These equations together capture the interplay between electrical pumping, photon generation and loss, and laser output under different operating conditions. In this example, the VCSEL has a 3 dB corner frequency of 32 GHz at full bias with the bandwidth dropping to ~22 GHz at its lowest operating bias. A 50 Gbaud input data signal with 5 ps rise and fall times is utilized in the model.

Eye pattern 900 for a single VCSEL modulated to each of the PAM-4 states shows eye skew in the temporal dimension, as indicated by the dashed lines showing ~3 ps skew, and unequal eye openings are shown in the VCSEL output, both attributed to change in VCSEL bandwidth as the input transitions from one state to another. In a conventional PAM laser modulation, these effects need compensation through complex digital signal processing, and are more pronounced as baud rate is increased in relation to VCSEL bandwidth.

Eye pattern 920 shows the same 50 Gbaud input applied to a three VCSEL configuration, where each VCSEL operates in only two states, HIGH and LOW, where the output shown is the sum of all three VCSEL outputs. Due to the high bias and only two states, all VCSELs maintain constant and high bandwidth. As shown by eye pattern 920, there is approximately zero (<0.5 ps) skew and equal eye openings for all states and transitions. Thus, complex and power consuming digital signal processing is not required.

Another advantage of the disclosed multi-light source binary keyed modulation scheme is that operating three VCSELS, edge-emitting lasers, or LEDs in synchronized NRZ mode enables three times the power of a single light source in PAM-4, which improves optical signal to noise ratio. In addition, the constant bandwidth with a single ON state output level reduces ISI, improving bit error rate (BER), which can eliminate the need for forward error correction (FEC) and its related hardware and latency overhead.

In disclosed examples, an optical communication system comprises an array of light sources, a control circuit, and an optical coupling mechanism. The system may be operable to configure, using the control circuit, each of the light sources in the array of light sources in a HIGH or LOW state based on a received input signal to generate a plurality of optical output signals. While the light sources are biased at HIGH and LOW states, it is understood that there may be leading and trailing edge manipulation for compensation purposes. The plurality of optical output signals may be communicated to the optical coupling mechanism and combined into a single optical signal thereby generating a multi-level output signal representative of the received input signal, which may mimic the output of a single light source modulated to each output level, but with enhanced performance.

The multi-level output signal may be communicated to a receiver. The multi-level output signal may comprise a Pulse Amplitude Modulated (PAM) equivalent modulated signal, in that the signal is identical to a typical PAM signal but generated with different means including a plurality of sources. The array of light sources may comprise vertical cavity surface emitting lasers (VCSELs), edge-emitting lasers, light emitting diodes (LEDs), plasma sources, or back-lid LCDs. The light source HIGH state output level of each light source may be binary weighted with respect to another light source of the array, with an optical output area of each being a factor of two with respect to another light source of the array of light source arrays. The optical coupling mechanism may comprise a lens or a photonic integrated circuit (PIC). The PIC may comprise a waveguide coupler. The light source array may be bonded to the PIC or may be laterally adjacent to the PIC.

In another example embodiment, all light sources may have the same maximum power where each light source is modulated to its maximum power and the output signals from each light source are combined to generate multiple output power levels from the system. In another example, all light sources have the same maximum power, but each light source is modulated to a different power level, where in this case, there is no need to combine output signals, eliminating the need for combining optics disclosed above.

In yet another example embodiment, each light source may have a different maximum power level, where each light source is modulated to its maximum power, and there is again no need for combining of the optical signals to generate the multi-level signal. Finally, each light source may have a different maximum power and each light source is modulated to its maximum power and then combined to generate multiple output power levels. Therefore, this enables the use of the same or different VCSEL, or other laser or LED structures, depending on chip size constraints, power requirements, manufacturing cost considerations, and design complexity, for example.

In an example embodiment, a multi-level optical signal generation system may comprise an array of light sources and a control circuit, with the system being operable to generate a multi-amplitude optical signal by individually configuring, using the control circuit, each of the light sources in the array of light sources in a HIGH or LOW state based on a received input signal, wherein the HIGH state is different for each of the light sources of the array.

In another example embodiment, a method for generating a multi-level optical signal may comprise, in an array of light sources and a control circuit, generating a multi-amplitude optical signal by individually configuring, using the control circuit, each of the light sources in the array of light sources in a HIGH or LOW state based on a received input signal, wherein the HIGH state is different for each of the light sources of the array.

In the drawings, similar features are denoted by the same or similar reference signs throughout.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

The invention claimed is:

1. A system for optical signal generation comprising:
- an array of light sources;
- a control circuit; and
- an optical coupling mechanism, the system being operable to:
  - individually configure, using the control circuit, each of the light sources in the array of light sources in a HIGH or LOW state based on a received input signal to generate a plurality of optical output signals; and
  - couple and combine, using the optical coupling mechanism, the plurality of optical output signals into a single optical signal thereby generating a multi-amplitude output signal representative of the received input signal, wherein:
    - each light source is modulated only between the HIGH state and the LOW state during signal generation, and
    - the multi-amplitude output signal is generated by summation of the plurality of optical output signals from the array of light sources.

2. The system of claim 1, wherein the multi-level output signal comprises a Pulse Amplitude Modulated (PAM) equivalent signal.

3. The system of claim 1, wherein the array of light sources comprises vertical cavity surface emitting lasers (VCSELs).

4. The system of claim 1, wherein the light source HIGH state of each light source is binary weighted with respect to another light source of the array of light sources, with an optical output area of each being a factor of two with respect to another light source of the array of light sources.

5. The system of claim 1, wherein the array of light sources comprises edge-emitting lasers.

6. The system of claim 1, wherein the array of light sources comprises light emitting diodes.

7. The system of claim 1, wherein the optical coupling mechanism comprises one or more lenses.

8. The system of claim 1, wherein the optical coupling mechanism comprises a photonic integrated circuit (PIC).

9. The system of claim 8, wherein the PIC comprises a waveguide coupler.

10. The system of claim 8, wherein the array of light sources is bonded to the PIC.

11. The system of claim 8, wherein the array of light sources is laterally adjacent to the PIC.

12. The system of claim 1, wherein a subset of the array of light sources provide redundancy for other light sources of the array of light sources.

13. A method of generating optical signals comprising:
- in a light source generation system comprising an array of light sources, an optical coupling mechanism, and a control circuit:
  - configuring, using the control circuit, each of the light sources in the array of light sources in a HIGH or LOW state based on a received input signal to generate a plurality of optical output signals;
  - coupling and combining, using the optical coupling mechanism, the plurality of optical output signals into a single optical signal thereby generating a multi-amplitude output signal representative of the received input signal, wherein:
    - each light source is modulated only between the HIGH state and the LOW state during signal generation, and
    - the multi-amplitude output signal is generated without modulating any individual light source to more than two optical output amplitude levels.

14. The method of claim 13, wherein the multi-level output signal comprises a Pulse Amplitude Modulated (PAM) equivalent signal.

15. The method of claim 13, wherein the array of light sources comprises vertical cavity surface emitting lasers (VCSELs).

16. The method of claim 13, wherein the light source HIGH state of each light source in the array of light sources is binary weighted with respect to another light source of the array of light sources, with an optical output area of each being a factor of two with respect to another light source of the array of light sources.

17. The method of claim 13, wherein the array of light sources comprises edge-emitting lasers.

18. The method of claim 13, wherein the array of light sources comprises light emitting diodes.

19. The method of claim 13, wherein the optical coupling mechanism comprises one or more lenses.

20. The method of claim 13, wherein the optical coupling mechanism comprises a photonic integrated circuit (PIC).

21. The method of claim 20, wherein the PIC comprises a waveguide coupler.

22. The method of claim 20, wherein the array of light sources is bonded to the PIC.

23. The method of claim 20, wherein the array of light sources is laterally adjacent to the PIC.

24. The method of claim 13, wherein a subset of the array of light sources provides redundancy for other light sources of the array of light sources.

25. A system for optical signal generation comprising:
- an array of light sources and a control circuit, the system being operable to generate a multi-amplitude optical signal by individually configuring, using the control circuit, each of the light sources in the array of light sources in a HIGH or LOW state based on a received input signal, wherein:
  - the HIGH state is different for each of the light sources of the array, each light source is restricted to binary modulation states during signal generation, and the multi-amplitude optical signal is generated through optical summation of output signals from the array of light sources.

26. A method of optical signal generation comprising:

in a light generation system comprising an array of light sources and a control circuit:

configuring, using the control circuit, each of the light sources in the array of light sources in a HIGH or LOW state based on a received input signal to generate a multi-amplitude optical signal, wherein:

the HIGH state is different for each of the light sources of the array, each light source is operated only between binary HIGH and LOW states during signal generation, and the multi-amplitude optical signal is generated by summation of optical outputs from the array of light sources without modulating any individual light source to more than two optical output amplitude levels.

* * * * *